(12) United States Patent
Enrietti

(10) Patent No.: US 7,205,511 B2
(45) Date of Patent: Apr. 17, 2007

(54) COMBINED HEATER AND HEAT DIFFUSER FOR AN INJECTION NOZZLE FOR MOULDING PLASTICS MATERIALS AND A METHOD FOR THE MANUFACTURE THEREOF

(76) Inventor: Piero Enrietti, Via Roma 164, Donnas (Aosta) I-11020 (IT)

( * ) Notice: Subject to any disclaimer, the term of this patent is extended or adjusted under 35 U.S.C. 154(b) by 0 days.

(21) Appl. No.: 10/543,505

(22) PCT Filed: Jan. 23, 2004

(86) PCT No.: PCT/EP2004/000555

§ 371 (c)(1),
(2), (4) Date: Jul. 27, 2005

(87) PCT Pub. No.: WO2004/067255

PCT Pub. Date: Aug. 12, 2004

(65) Prior Publication Data
US 2006/0102617 A1 May 18, 2006

(30) Foreign Application Priority Data
Jan. 27, 2003 (IT) .............................. TO03A0042

(51) Int. Cl.
*H05B 3/58* (2006.01)
*B29C 45/20* (2006.01)

(52) U.S. Cl. .................. 219/535; 219/534; 219/536; 425/549

(58) Field of Classification Search ............... 219/535, 219/534, 536; 338/285

See application file for complete search history.

(56) References Cited

U.S. PATENT DOCUMENTS

| | | | | |
|---|---|---|---|---|
| 4,035,613 A | | 7/1977 | Sagawa et al. | |
| 4,222,155 A | * | 9/1980 | Oetiker | 24/20 R |
| 4,386,262 A | | 5/1983 | Gellert | |
| 5,135,377 A | * | 8/1992 | Gellert | 425/130 |
| 5,226,596 A | * | 7/1993 | Okamura | 239/1 |
| 5,360,333 A | * | 11/1994 | Schmidt | 425/549 |
| 5,411,392 A | * | 5/1995 | Von Buren | 425/549 |
| 5,614,233 A | * | 3/1997 | Gellert | 425/549 |
| 5,704,113 A | * | 1/1998 | Mak | 29/611 |

(Continued)

FOREIGN PATENT DOCUMENTS

DE    37 36 612 A    5/1989

(Continued)

OTHER PUBLICATIONS

Maenner et al.: "Duesen Richtig Einheizen" Kunststoffberater, Kunststoff Verlag, Isernhagen, DE, vol. 46, No. 1, May 1, 2001, p. 25, XP001005069 ISSN: 0172-6374.

*Primary Examiner*—Robin Evans
*Assistant Examiner*—Vinod Patel
(74) *Attorney, Agent, or Firm*—Sughrue Mion, PLLC

(57) ABSTRACT

A combined heater and heat diffuser for fitting to an injection nozzle (10) for moulding plastics materials, where the nozzle comprises a tubular metal core (12) with an injection duct (14) and a cylindrical lateral surface (13). The heater and heat diffuser includes a resistor (40) housed in a channel-shaped seat (32) formed in a cylindrical internal surface (30*d*) of a heat diffuser (30) made of a metal material of a tubular shape for fitting around the core (12) of the nozzle.

11 Claims, 7 Drawing Sheets

U.S. PATENT DOCUMENTS

| | | | |
|---|---|---|---|
| 6,043,466 A * | 3/2000 | Jenko et al. | 219/535 |
| 6,222,165 B1 | 4/2001 | Schwarzkopf | |
| 6,394,784 B1 * | 5/2002 | Gellert et al. | 425/549 |
| 6,561,789 B2 * | 5/2003 | Gellert et al. | 425/549 |
| 6,638,053 B2 * | 10/2003 | Gellert et al. | 425/549 |
| 6,764,297 B2 * | 7/2004 | Godwin et al. | 425/549 |
| 2005/0181090 A1 * | 8/2005 | Olaru | 425/549 |

FOREIGN PATENT DOCUMENTS

| | | |
|---|---|---|
| DE | 195 02 327 A | 9/1995 |
| DE | 295 10 136 U | 9/1995 |
| DE | 202 12 918 U | 10/2002 |
| EP | 0 695 617 A | 2/1996 |
| EP | 0 806 276 A | 11/1997 |
| EP | 1 051 059 A2 | 3/2000 |
| EP | 1 395 085 A2 | 3/2004 |
| GB | 2 295 758 A | 6/1996 |

* cited by examiner

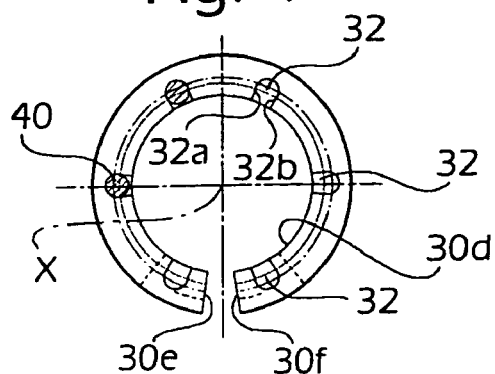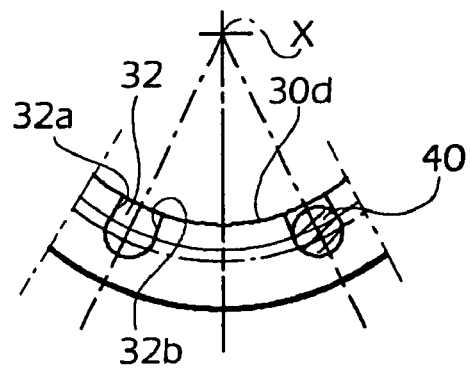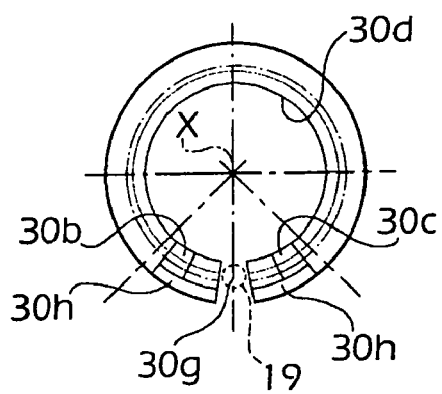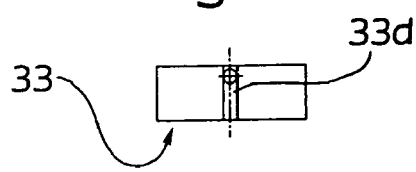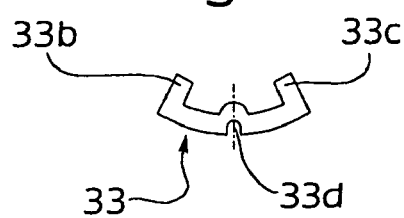

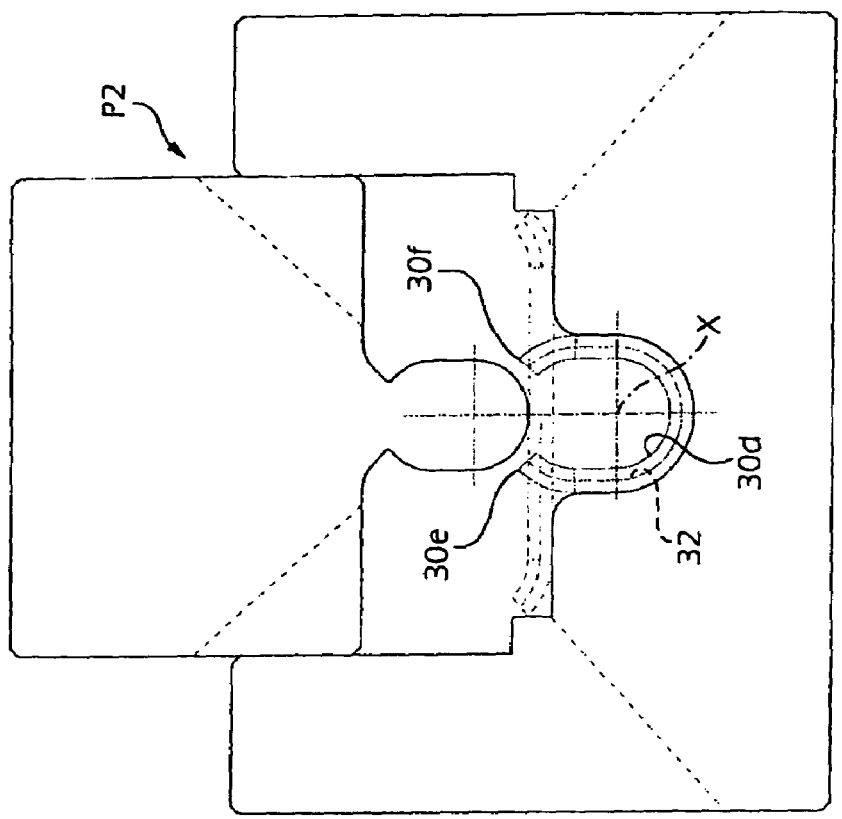
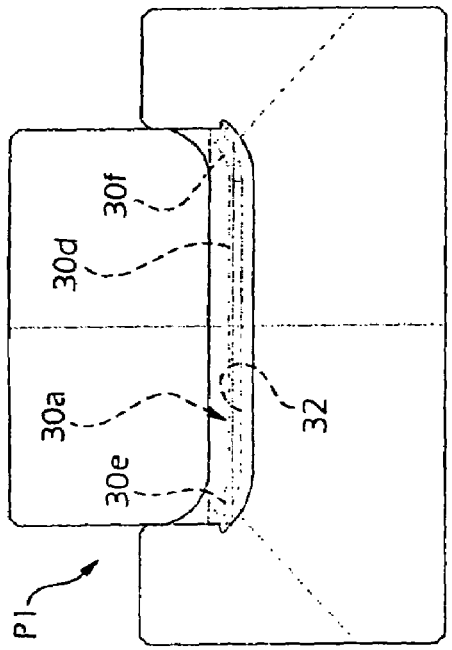
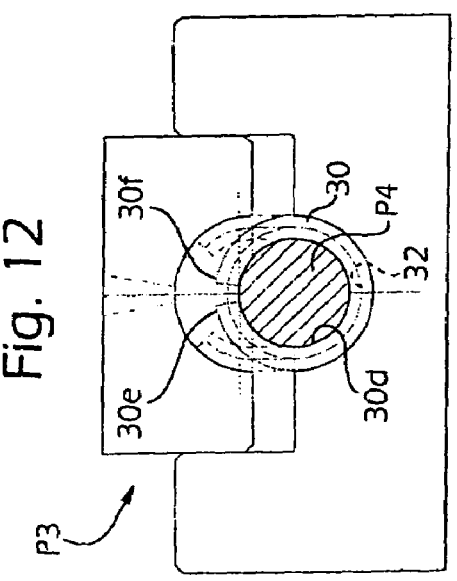

COMBINED HEATER AND HEAT DIFFUSER FOR AN INJECTION NOZZLE FOR MOULDING PLASTICS MATERIALS AND A METHOD FOR THE MANUFACTURE THEREOF

This is a National Stage entry of International Application PCT/EP2004/000555, with an international filing date of Jan. 23, 2004, which was published as WO 2004/067255 A1, and the complete disclosure of which is incorporated into this application by reference.

BACKGROUND OF THE INVENTION

The present invention relates to a combined heater and heat diffuser for an injection nozzle for the moulding of plastics materials; the invention also relates to a method for manufacturing such a heater-heat diffuser.

Conventionally, an injection nozzle for moulding plastics materials comprises a steel cylindrical tubular core which forms a central longitudinal injection duct for injecting the molten plastics material through one or more injection holes into the moulding cavity of a mould. An electrical resistor is wound around the tubular core for heating the plastics material flowing through the injection duct and for maintaining the parts of the nozzle in contact with the flow of material at a controlled temperature in order to prevent the flow from solidifying. The coils of the resistor are usually closer together in the area near the injection aperture, which is closer to the moulding cavity and thus tends to cool more quickly than the central portion of the nozzle. A capillary thermocouple measures the temperature of the nozzle near the injection aperture. The heat imparted by the resistor tends to accumulate in the central portion of the nozzle, which reaches higher temperatures than the area around the injection aperture which are at times unacceptable for the type of plastics material being moulded, which needs to be kept within a somewhat low temperature range, otherwise the material may deteriorate. It can therefore happen that the resistor is activated as soon as the thermocouple detects that the temperature in the region of the injection aperture has dropped below an established minimum, while the temperature of the central portion of the injection duct, while still acceptable, rises on activation of the resistor until it goes over the maximum admissible value for the material.

Such prior art arrangements mostly use spiral resistors with a rectangular cross section in order to increase the contact surface between the resistor and the tubular core of the nozzle around which it is wound. However, this contact surface constitutes only a fraction of the overall surface of the resistor, so that most of the heat generated by the resistor is not in fact transmitted to the nozzle but is dissipated into the surrounding mould and therefore wasted. In fact the mould needs to be cooled in order to keep the surfaces of the moulding cavity at the lowest possible temperature in order to speed up the solidification of the molten material and thereby shorten moulding cycles.

In order to dissipate heat from the central portion of the nozzle and to diffuse it more evenly along the injection duct, it has been suggested that the resistor be incorporated in a tubular diffuser element made of metal which is fitted on the outside of the tubular core of the nozzle. In this arrangement, a channel-like seat is formed in the outer surface of a cylindrical tubular element for inserting the resistor therein. In this case as well, however, excessive heat is dissipated from the outer surface of the resistor into the surrounding mould; in addition, there is no direct contact between the resistor and the tubular core of the nozzle (and therefore no direct heat transmission by conduction).

SUMMARY OF THE INVENTION

The object of the present invention is therefore to provide a combined heater and heat diffuser of an improved type, the main aim being to solve the problems of:
evenly heating the injection duct of a nozzle within an established and limited temperature range;
avoiding heat accumulation and therefore excessively high temperatures in the central portion of the nozzle; and
optimizing the electrical power consumption to operate the resistors, as well as reducing the amount of heat dissipated into the mould in which the nozzles are fitted.

These and other objects and advantages, which will be understood better later, are achieved according to a first aspect of the invention by providing a combined heater and heat diffuser having the features mentioned in the claims.

An additional object of the invention is to manufacture an improved type of heater and heat diffuser both simply and economically. This additional object is achieved, in accordance with a second aspect of the invention, by providing a method as defined in the claims. Preferred embodiments of the invention are described in the dependent Claims.

BRIEF DESCRIPTION OF THE DRAWINGS

Characteristics and advantages of the invention will become apparent from the detailed description of one embodiment thereof, with reference to the appended drawings, provided purely by way of non-limitative example, in which:

FIG. 4 is a section taken on the line IV—IV of FIG. 2;

FIG. 4a is an enlarged view of a detail of FIG. 4;

FIG. 5 is a view from above along the arrow V of FIG. 2;

FIGS. 6 and 7 are a side view and a plan view respectively of a locking clip to be fitted to the diffuser of FIG. 2;

FIGS. 10 to 12 are views illustrating schematically three different folding steps in the manufacture of a heat diffuser of FIG. 2.

DETAILED DESCRIPTION OF THE INVENTION

Figure 1:
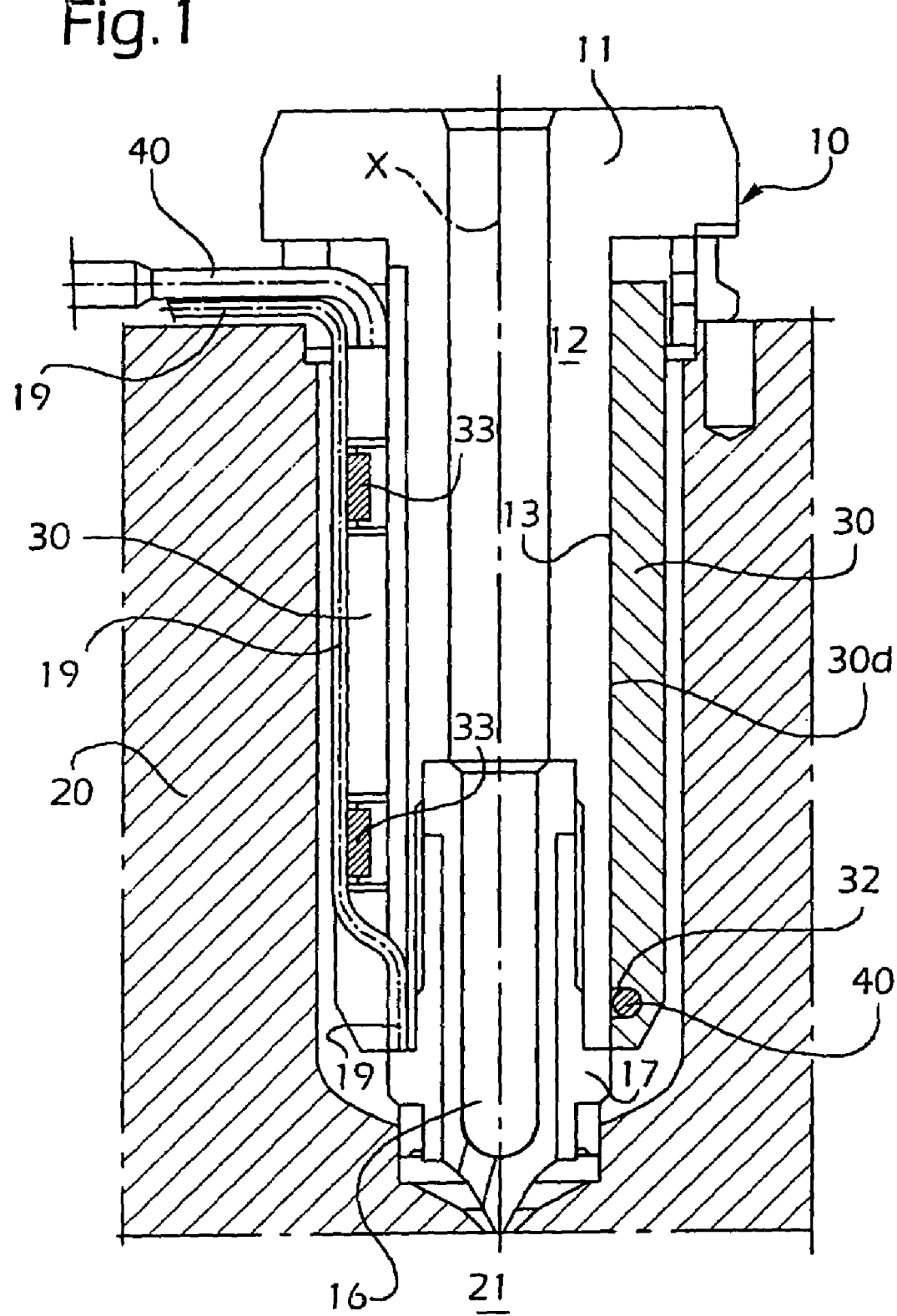
FIG. 1 is a view in cross section of an injection nozzle with a combined heater and heat diffuser according to the present invention.
Figure 2:
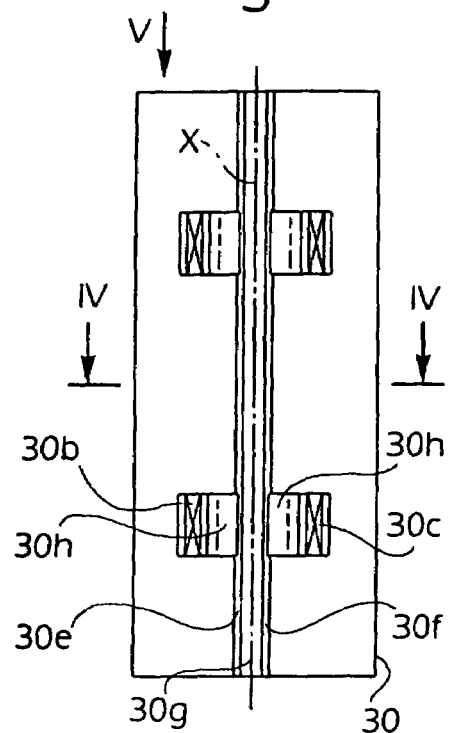
FIG. 2 is an elevational view of a heat diffuser device of the invention.

With reference now to FIG. 1, an injection nozzle for moulding plastics materials, generally indicated 10, is mounted in a mould 20 with a moulding cavity 21. It is clear that any reference to the types of nozzle and mould shown in the FIG. 1 should not in any way be interpreted as limiting the scope of the invention. The invention is equally applicable to nozzles having more than one injection aperture and to multiple cavity moulds, as will be apparent to those skilled in the art.

The nozzle 10 comprises a steel body 11 forming in one piece a core 12 in the form of a cylindrical tube with an outer lateral surface 13.

The tubular core 12 has a central longitudinal injection channel 14 extending from an upper portion 15 for intake of the molten material to a lower portion 16 into which is inserted a conventional tip 17 which forms the end portion of the injection channel 14. A capillary thermocouple, indicated 19, extends close to the lower portion 16 of the injection channel 14 for measuring the temperature near the area where the molten plastics material is injected into the moulding cavity.

A cylindrical tubular diffuser 30 is fitted on the outer lateral surface 13 of the core 12, the central cylindrical cavity thereof being congruent with the lateral surface 13 of the core. The diffuser 30 is made of a metal or a metal alloy with high thermal conductivity, such as brass, copper or aluminium and, when fitted on a nozzle as shown in FIG. 1, extends substantially along the entire length of the core 12.

An important characteristic of the arrangement of the invention consists in the fact that on its internal cylindrical surface 30d the diffuser has a concave seat 32 in the form of a channel which houses an electrical resistor 40 for heating the core 12 directly. The channel 32 follows a path around the lateral surface of the core in such a way that the resistor 40 transmits heat uniformly to the core 12, cooperating with the diffuser 30. Thanks to its high thermal conductivity, the diffuser 30 also ensures that a substantially even temperature is maintained along the core 12 and prevents heat accumulation and the possibility of excessively high temperatures arising in the central portion of the nozzle.

The method for manufacturing the combined heater and heat diffuser of the invention is as follows.

Figure 8:
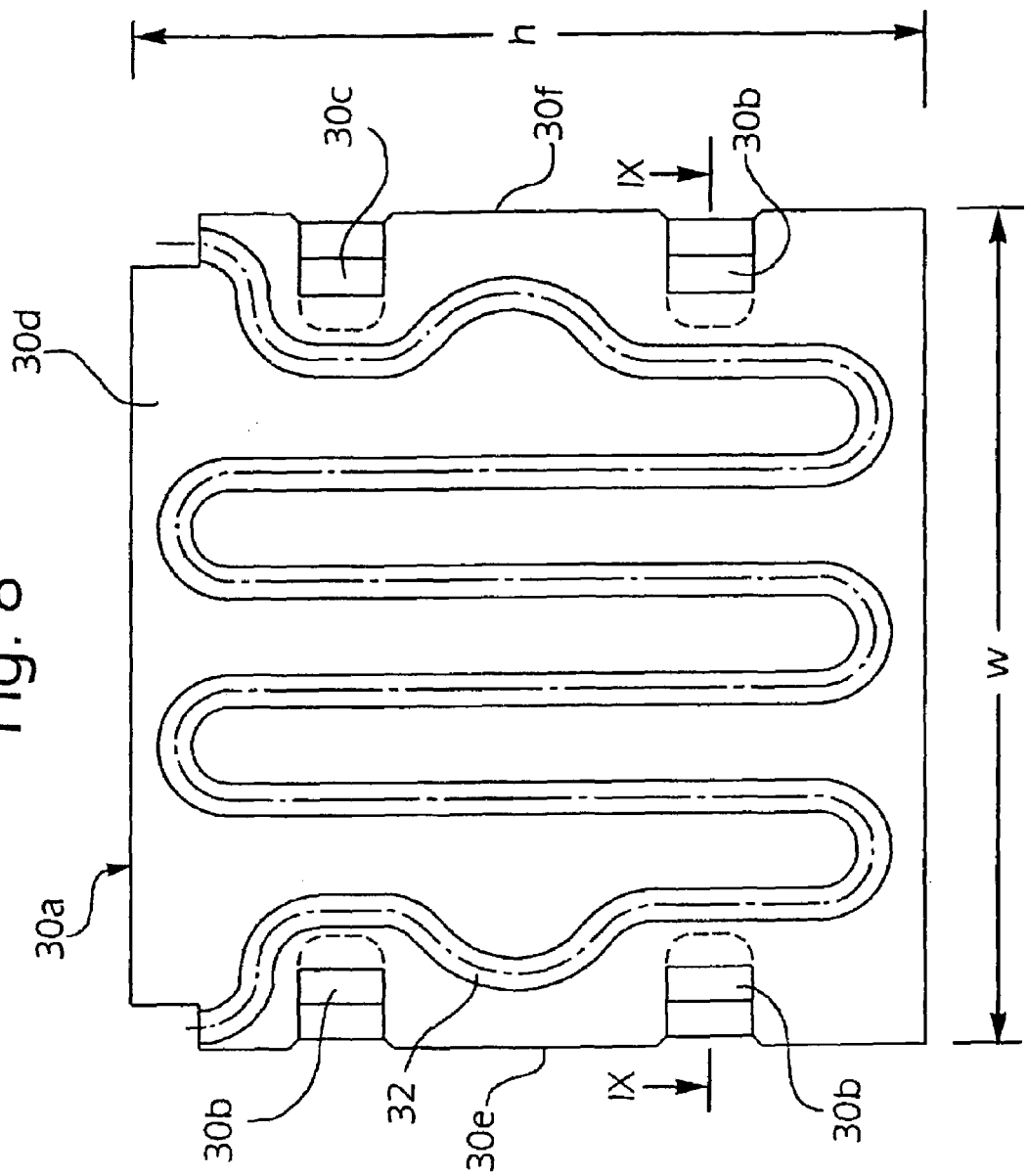
FIGS. 8 and 9 are a plan view and a section taken on the line IX—IX, respectively, of a semi-finished product for producing a diffuser of the type shown in FIG. 2.
Figure 9:
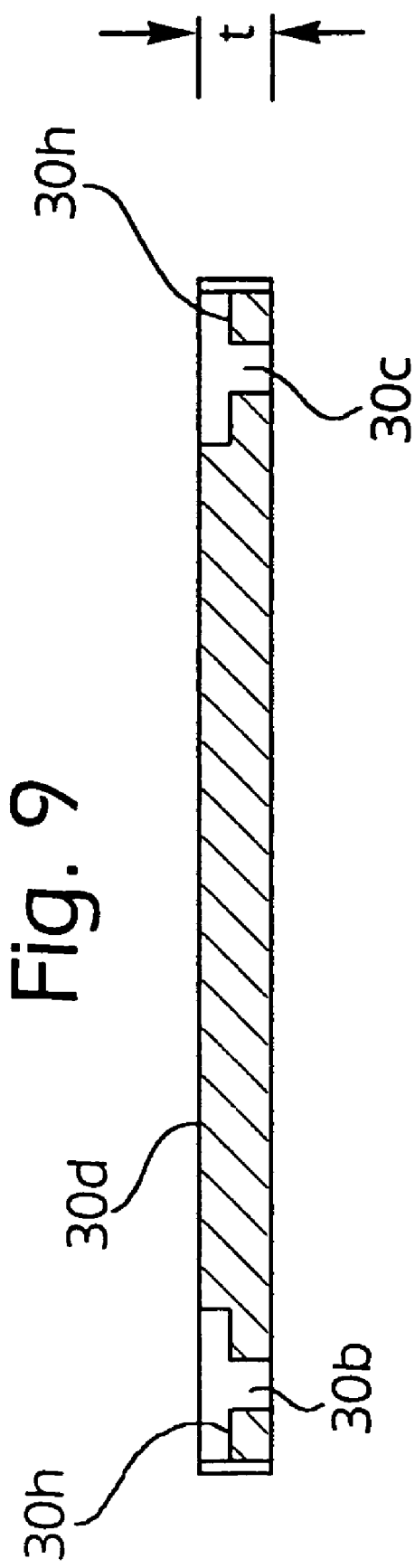

A substantially rectangular flat plate, such as that indicated 30a in FIGS. 8 and 9 is obtained from a flat sheet of metal. The length h of the plate 30a corresponds to the length of the core 12 of the nozzle onto which the diffuser is to be fitted, while the width w corresponds to the circumference of the cylindrical surface 13 of the core. The thickness t of the plate is selected so that the channel 32 which is subsequently formed in one of the two faces thereof is suitable to house a wire resistor 40 of a diameter selected in dependence on the electrical characteristics desired. For example, in order to house a 1 mm wire a plate of about 2 mm thick could be used. In the preferred embodiment illustrated in the drawings, pairs of small apertures 30b, 30c are also formed at this stage, aligned along the two opposite edges 30e, 30f of the plate. One surface 30d of the plate 30a is then worked, for example by milling, electro-eroding or other known method, so as to form a channel 32 with a substantially C or U shaped cross-section able to house a resistor 40 precisely or with a predetermined minimal clearance. Alternatively, the step of forming the channels 32 could be carried out on the initial metal sheet before it is cut into a number of plates corresponding to the number of channels.

Figure 3:
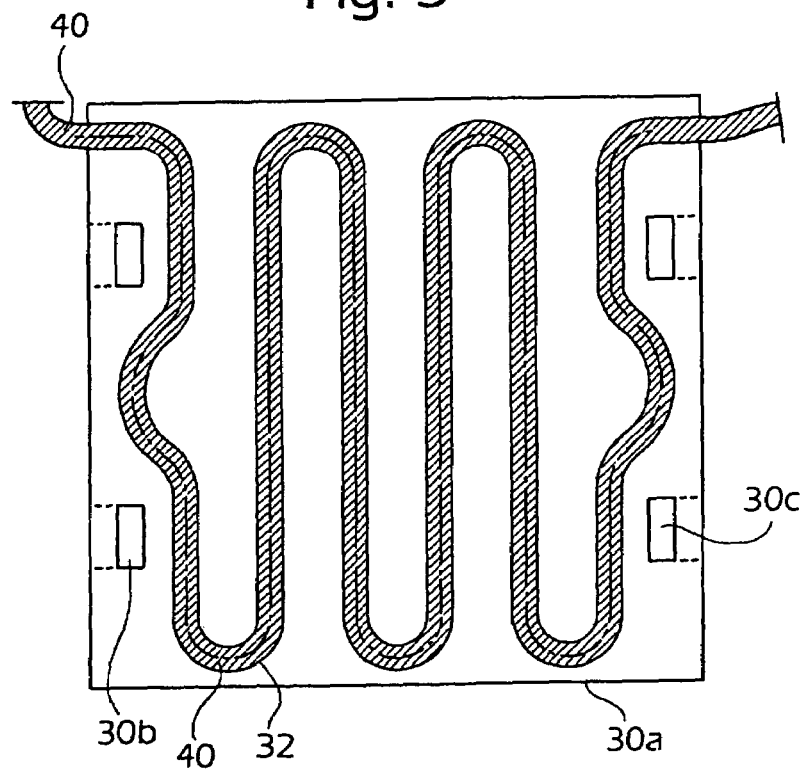
FIG. 3 is a plan view of one of the sides of the diffuser of FIG. 2 in an initial, flat condition.

The resistor 40 is then inserted into the channel 32 (FIG. 3). The surface of the resistor is flush with the surface 30d having the channel 32 or projects slightly beyond it in order to ensure that it is in direct contact with the nozzle when in the assembled condition.

The plate 30a with the resistor fitted is then placed in a first folding device P1 (FIG. 10) where the two opposite edges 30e, 30f of the plate are curved towards the side where surface 30d is facing. The plate is then placed in a second folding device P2 (FIG. 11) where a C or U shape is imparted to the plate. Finally, a third folding device P3 (FIG. 12) gives the body 30 its definitive form as a substantially closed ring, thereby obtaining a cylindrical tubular body with a central longitudinal axis x parallel to the opposite edges 30e, 30f.

During this folding step a cylindrical forming tool P4 is placed in contact with the internal surface 30d of the plate; the diameter of the tool P4 is the same as that of the cylindrical surface 13 of the core 12 of the nozzle on which the diffuser is to be fitted.

During the folding steps shown in FIGS. 11 and 12, the bending of the diffuser 30 also provides the advantage of a slight convergence of the facing surfaces 32a, 32b of the channel 32, at least along those portions where the channel 32 is parallel to the longitudinal axis of the diffuser. The convergence of the facing surfaces 32a, 32b towards the centre of the diffuser (FIG. 4a) also serves to lock the resistor 40 in the channel 32. In this case, the shape and dimensions of the channel 32 and of the resistor 40 should naturally be determined with precision in order to obtain this locking effect.

In order to maintain the diffuser in its final cylindrical configuration, the facing longitudinal edges 30e, 30f of the diffuser 30 are secured to each other by metal clips (illustrated separately FIGS. 6 and 7) with radial tabs 33b, 33c for insertion into the respective apertures 30b, 30c. Advantageously, a longitudinal gap 30g is formed between the facing longitudinal edges 30e, 30f along a generatrix of the cylindrical surface of the diffuser 30. This gap can house a capillary thermocouple 19, as shown schematically in FIGS. 1 and 5. In this event, the core 12 of the nozzle does not need to be specially worked to form the side channel indicated 18 in FIG. 1. The clips 33 each form a longitudinal groove 33d for inserting the capillary thermocouple 19; careful attention to the dimensions of the groove 33d ensures that it can grip the thermocouple and hold it in the correct position along the gap 30g.

In order that the clips 33 may be fitted without projecting from the outer circular outline of the diffuser 30, it is preferable if the areas of the outer surface indicated 30h, which are between the apertures 30b, 30c and the edges of the diffuser, are milled or otherwise worked to form recesses of a depth corresponding to the thickness of the clips.

Other arrangements than the clips 33 can be used to secure the edges 30e, 30f to each other; for example, the facing edges could be joined by spot welding.

It will be appreciated that, unlike the case of prior art diffusers discussed in the introductory part of this description, according to the present invention the resistor 40 is in direct contact with the core 12 of the nozzle. The even distribution of the resistor around the internal cylindrical surface of the diffuser ensures that heat is transmitted evenly along the injection duct, especially in the area nearest the injection aperture. In addition, since the resistor 40 is in direct contact with the cylindrical surface 13 of the nozzle core, it takes less electrical power to heat the injection duct to the prescribed temperature and to maintain this. The portion of the surface of the resistor 40 in contact with the surface of the channel 32 transmits heat to the diffuser 30 instead of dispersing it into the mould.

Figure 14:
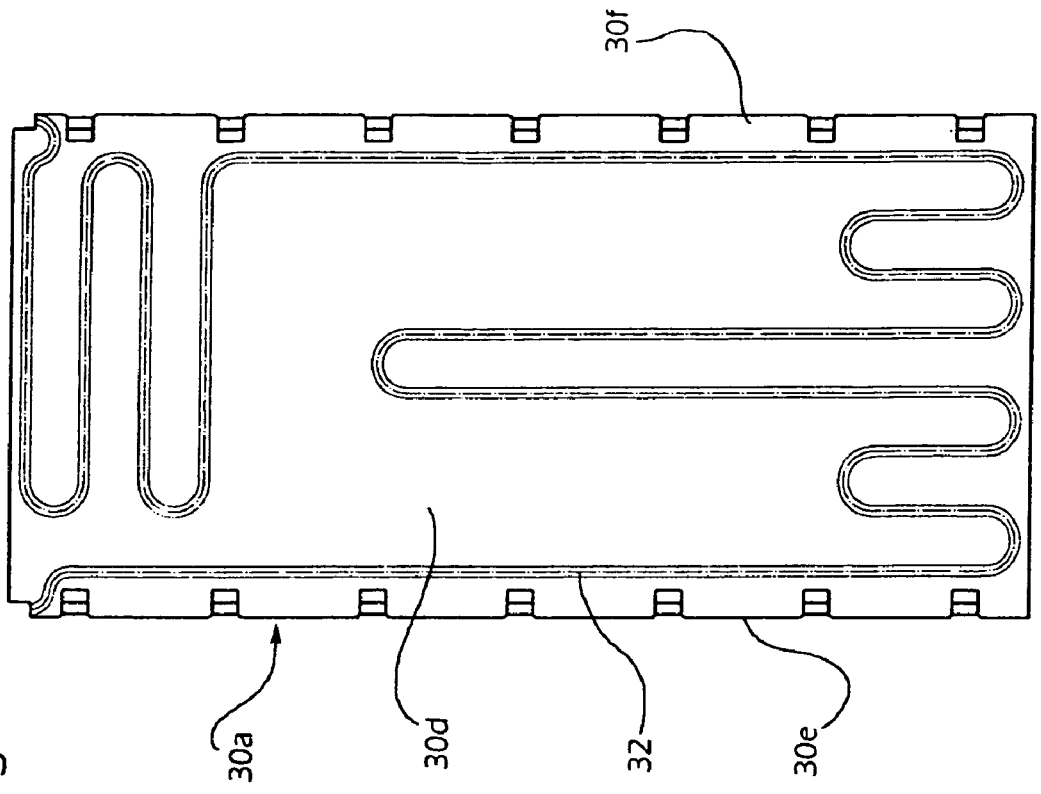
FIGS. 13 and 14 are two plan views similar to FIG. 2 of two further embodiments of a heat diffuser according to the invention.
Figure 13:
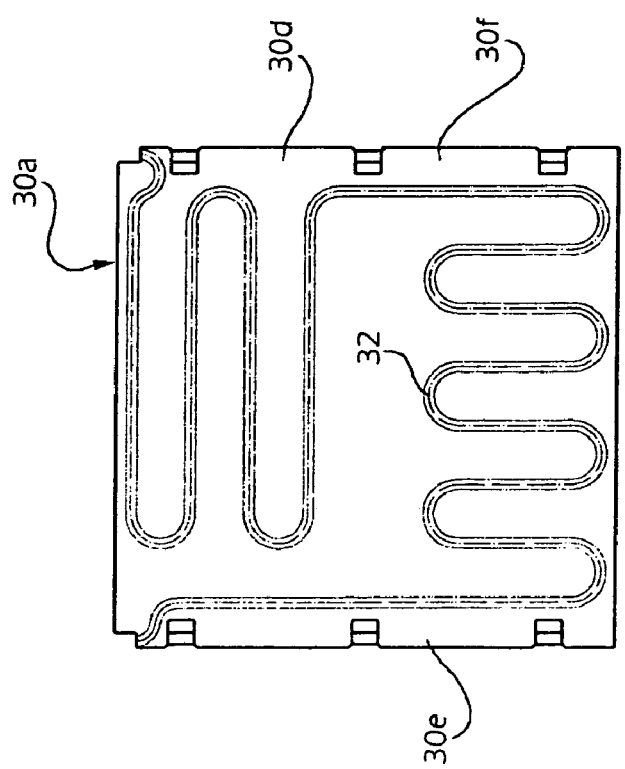

It is clear that the invention is not limited to the embodiments described and illustrated here, which should be seen as examples of embodiments of the diffuser and of methods for the manufacture thereof. The invention may instead be subjected to changes as to the shape and arrangement of parts, and constructional and functional details. For example, as shown in FIGS. 13 and 14, the path of the channel 32 along the inner surface of the diffuser can vary in dependence on the type of nozzle and on the dimensions and operating requirements thereof. FIGS. 13 and 14 show two examples in which the channel 32 (and therefore the resistor 40) is distributed more densely at the upper and lower ends of the diffuser and less densely in the central portion in order to prevent heat from accumulating in this region.

What is claimed is:

1. A combined heater and heat diffuser for fitting to an injection nozzle (10) for moulding plastics materials, wherein the nozzle comprises a tubular metal core (12) with a central, longitudinal injection duct (14) and an outer lateral surface which is essentially cylindrical (13), and wherein the heater and heat diffuser includes
   a heat diffuser element (30) made of metal and substantially tubular in shape
   with a central cavity defined by an essentially cylindrical internal surface (30d) congruent with the cylindrical surface (13) of the nozzle core and with a concave seat (32) in the form of a channel in a surface of the diffuser (30), and
   a resistor element (40) accommodated in the said channel-shaped seat (32);
   wherein the channel-shaped seat (32) is formed in the internal cylindrical surface (30d) and wherein the resistor element (40) is arranged substantially flush with the said internal surface in order to transmit heat directly to the nozzle core, and
   wherein the body of the heat diffuser (30) is cylindrical and bent into a substantially closed ring with a longitudinal discontinuity along a generatrix of the cylinder formed by two facing edges (30e, 30f).

2. A device according to claim 1, wherein the facing longitudinal edges (30e, 30f) form between them a longitudinal gap (30g) for housing a capillary thermocouple (19).

3. A device according to claim 1, wherein the channel seat (32) is substantially C or U shaped in cross section in order to accommodate a wire resistor (40) accurately or with a predetermined minimal clearance or with slight interference.

4. A device according to claim 3, wherein the facing surfaces (32a, 32b) of the said channel seat (32) converge slightly towards the centre of the diffuser (30) so as to hold the resistor (40) in the seat (32).

5. A device according to claim 1, wherein the resistor element (40) is arranged in the channel-shaped seat (32) in such a way that, when the device is fitted onto a nozzle, the resistor (40) is in direct contact with the outer surface (13) of the core (12) of the nozzle.

6. A method for the manufacture of a combined heater and heat diffuser according to claim 1, wherein the method includes the steps of:
   a) obtaining a metal plate (30a) substantially rectangular in shape and of a length (h) corresponding to the length of the core (12) of a nozzle onto which the heater-diffuser is to be fitted and of a width (w) corresponding to the circumference of the outer cylindrical surface (13) of the core (12);
   b) forming a concave seat (32) in the form of a channel in a surface (30d) of the plate (30a) along a predetermined path;
   c) inserting an electrical resistor (40) along this path in the channel-like seat (32);
   d) folding the plate (30a) about an axis (x) parallel to at least one edge (30e, 30f) thereof, thereby obtaining a heat diffuser element which is substantially a cylindrical tube (30) with the electrical resistor (40) arranged substantially flush with an internal cylindrical surface (30d) of the said diffuser element.

7. A method according to claim 6, wherein said folding step d) includes the step of
   d2) giving the plate (30a) a temporary substantially C or U shape.

8. A method according to claim 6, wherein said folding step d) includes the preliminary step of
   d1) bending the two opposite edges of the plate towards the way the surface (30d) with the channel seat (32) is facing.

9. A method according to claim 7, wherein said folding step d2) is followed by the step of
   d3) giving the plate (30a) the shape of a substantially closed ring.

10. A method according to claim 9, wherein said folding step d3) includes the step of inserting a cylindrical forming tool (P4) in contact with the internal surface (30d).

11. A method according to claim 6,
   wherein said step b) includes the step of forming the channel-like seat (32) with two opposite surfaces (32a, 32b), and that the folding step d) includes the step of causing the opposite edges (32a, 32b) to converge slightly towards the centre of the diffuser (30) whereby the converging facing edges (32a, 32b) cooperate to retain the resistor (40) in the channel-like seat (32).

* * * * *